United States Patent [19]

Brännström

[11] Patent Number: 4,619,562

[45] Date of Patent: Oct. 28, 1986

[54] PNEUMATIC TRANSPORTATION SYSTEM FOR POWDERED OR GRANULAR MATERIAL WITH A SWITCHING VALVE FOR SELECTION OF DIFFERENT TRANSPORT PATHS

[75] Inventor: Roine Brännström, Finspong, Sweden

[73] Assignee: Asea Stal AB, Västerås, Sweden

[21] Appl. No.: 664,174

[22] Filed: Oct. 24, 1984

[30] Foreign Application Priority Data

Oct. 31, 1983 [SE] Sweden ............................... 8305967

[51] Int. Cl.$^4$ .............................................. B65G 53/56
[52] U.S. Cl. .................................... 406/182; 137/874; 406/193
[58] Field of Search ....................... 406/182, 193, 181; 137/874

[56] References Cited

U.S. PATENT DOCUMENTS

| 610,066 | 8/1898 | Kuser | 406/193 X |
| 2,434,435 | 1/1948 | Reibel | 406/182 X |

FOREIGN PATENT DOCUMENTS

| 501591 | 6/1930 | Fed. Rep. of Germany . |
| 1224665 | 9/1966 | Fed. Rep. of Germany . |
| 592007 | 11/1975 | Switzerland . |
| 650909 | 3/1979 | U.S.S.R. ............................... 406/182 |

Primary Examiner—Jeffrey V. Nase
Attorney, Agent, or Firm—Pollock, Vande Sande & Priddy

[57] ABSTRACT

A pneumatic transportation system for particulate material, such as powdered or granular materials, with a switching valve (7) for selection of different transport paths within the transportation system. The valve includes a turnable rotor (15) with a bore or a compartment (23), the inner part of which constitutes a blind space for forming an erosion-preventing cushion (26) of powder. An upstream conduit (6) is connected to the valve housing (14) opposite to the blind space of the compartment (23). In dependence on the position of the rotor (15), the compartment (23) or a channel (24) adjacent to this forms a connection to any one of several downstream conduits (20, 21) connected to the valve housing (14).

16 Claims, 15 Drawing Figures

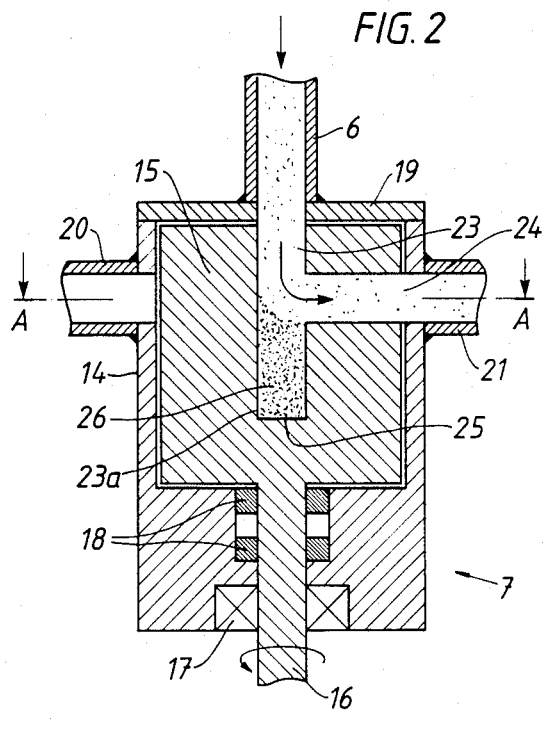
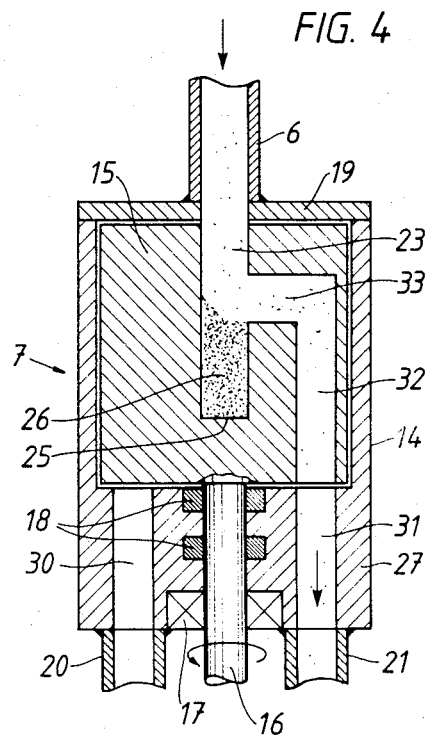
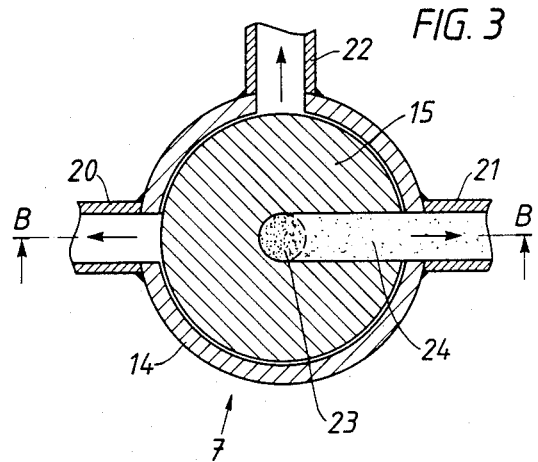

C-C

D-D

PNEUMATIC TRANSPORTATION SYSTEM FOR POWDERED OR GRANULAR MATERIAL WITH A SWITCHING VALVE FOR SELECTION OF DIFFERENT TRANSPORT PATHS

BACKGROUND OF THE INVENTION

The invention relates to a transportation system with a switching valve for selection of different transport paths. It can be applied to a system having a storage container from which goods are to be transported to one of a number of receiving containers connected to said storage container, the desired receiving container being switched in by means of said valve. It can also be applied to an ash feeding-out system in a combustion plant with combustion in a pressurized fluidized bed, usually called a PFBC plant. Applied to the latter system, it may be utilized for bypassing parts of an ash feeding-out system of the kind disclosed in more detail in U.S. patent application Ser. No. 563,427 filed Dec. 20, 1983, and corresponding to Swedish patent application No. 8205748-0. Such ash feeding-out systems comprise a number a series-connected tubes between which the ash-gas flow is transferred between an upstream tube and subsequent downstream tubes in a connecting chamber arranged at the ends of the tubes.

The invention aims to provide a pneumatic transportation plant with a switching possibility for selection of different transport paths by means of a valve having such a design that the risk of clogging, leading to stoppage, or the risk of rapid wear of the components included is reduced to the greatest possible extent. When applied to a PFBC plant, the purpose is also to be able to bypass parts of said ash feeding-out system in order to adapt the operating conditions therein with respect to a varying load. In this type of plants, the pressure and the ash quantity vary greatly in dependence on the load. An ash discharge device dimensioned for full load operation operates unsatisfactorily in partial load operation because the speed of transportation is so low that stoppage may occur. By shortening the transport path in the ash discharge device by bypassing certain parts, a smooth adaptation to partial load operation is made.

SUMMARY OF THE INVENTION

According to the invention, the transportation system comprises a valve having a compartment with a blind space for forming an erosion-preventing cushion of powder. The valve is provided with several connections for transport conduit means. An upstream conduit opens out into said compartment opposite to said blind space. By turning a rotary slide, said slide may be adjusted so that the compartment with the blind space, or a channel connected to said compartment, is aligned in such a way that a communication with an optional downstream conduit is obtained. An upstream conduit may be centrally connected to a valve housing by means of a rotary slide, whereas downstream conduits may be radially connected. In a second embodiment, both upstream conduits and downstream conduits may all be connected to the end wall of the same valve housing, with the downstream conduits connected radially outside the upstream conduit. In a third embodiment the upstream conduit may be connected to one end wall of the valve, whereas a number of downstream conduits are connected to the second end wall of the valve. In a valve with a radial connection of downstream conduits there is in the slide an axial bore centrally right in front of the upstream conduit, and there is a radial bore opening out into the axial bore a certain distance from the bottom thereof, thus forming a blind space in the inner part of said axial bore. By rotating the slide, this radial bore may be aligned such that the bore opens out into a downstream conduit. In the embodiment with both the upstream conduit and the downstream conduits connected to the same end wall, the slide may be formed with an axial, radially oriented space extending radially from the center out towards the periphery. This space forms a radial transfer channel from the upstream conduit to a downstream conduit selected by the adjustment of the slide.

When the invention is applied to an ash discharge device in a PFBC plant for bypassing parts of the ash discharge device under certain operating conditions, two upstream and two downstream conduits may be connected to the valve. The slide is provided with two compartments of the kind previously mentioned. The conduit connections and the compartments are located in such a way that, in a first position of the slide, a first compartment connects a first upstream conduit to a first downstream conduit and a second compartment connects a second upstream conduit to a second downstream conduit, whereas in a second position of the slide, the first compartment connects the first upstream conduit to the second downstream conduit. The whole of that part of the ash discharge device which is positioned between the connections for the first downstream conduit will then by bypassed, and only the remaining part of the ash discharge device will be utilized.

A plurality of switching valves may be mounted in an ash discharge device, so that a very careful adaptation of the operating conditions in the ash discharge device to the load of the PFBC plant can be achieved. It would also be possible to design switching valves so as to achieve a plurality of possibilities of by-passing tube parts in the ash discharge device with one single valve.

BRIEF DESCRIPTION OF THE DRAWINGS

The invention will be described in greater detail with reference to the accompanying drawings.

FIG. 2 shows an axial and FIG. 3 shows a radial section through a switching valve at section A—A according to FIG. 3 and section B—B according to FIG. 2;

FIGS. 4 and 5 show axial sections through valves of alternative designs;

DESCRIPTION OF BEST MODE AND OTHER EMBODIMENTS

Figure 1:
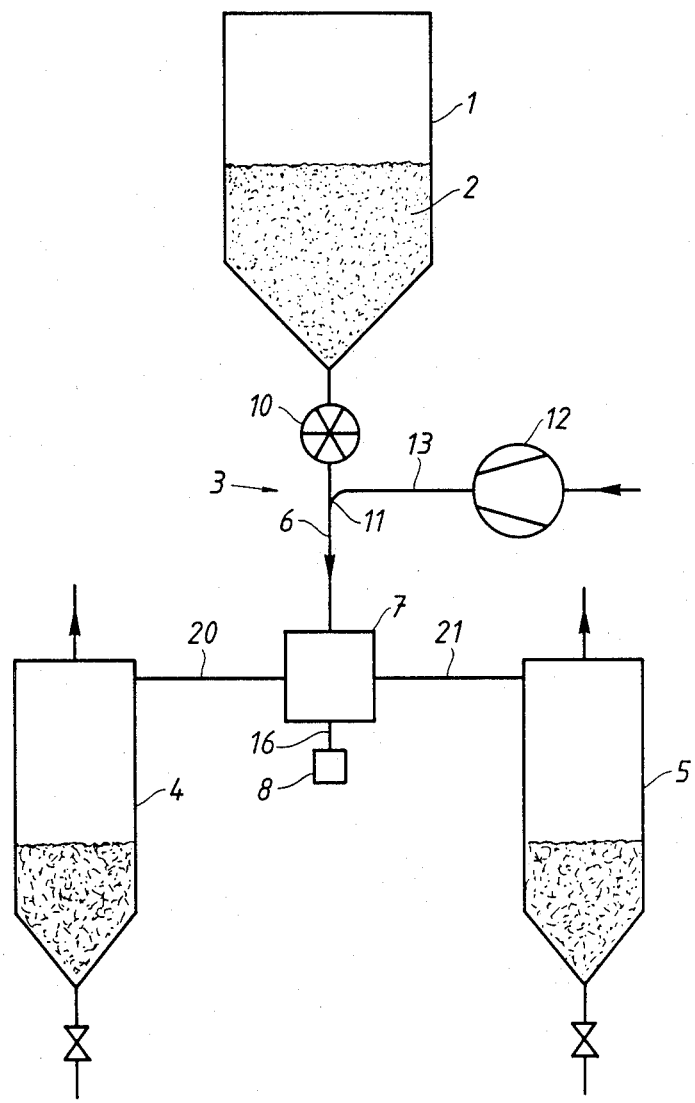
FIG. 1 shows schematically a pneumatic transportation system for alternative transfer of powder or granular material from a storage container to either of two receiving containers.

In FIG. 1, 1 designates a container containing a powder 2 which is to be transported through a transportation system 3 alternatively to container 4 or 5. The transportation system 3 comprises an upstream conduit 6 between the container 1 and a distribution valve 7, which is operated by an operating device 8. The transport conduit 6 includes a sluice valve 10, for example a rotary feeder, with an ejector nozzle 11, which is supplied with transport air from a compressor 12 through the conduit 13.

The valve 7 included in FIG. 1 has, in principle, the embodiment shown in FIGS. 2 and 3. It comprises a valve housing 14 with a rotary slide 15 which, via the shaft 16, is connected to the drive device 8. Between the shaft 16 and the housing 14 there is a bearing 17 and seals 18. The conduit 6 is centrally connected to the lid 19 of the housing 14. The downstream conduits 20 and 21 between the valve 7 and the containers 4 and 5, respectively, are radially connected to the valve housing 14. The valve housing 14 may be provided with additional connections for an additional or several additional conduits, indicated by the conduit 22. The valve slide is provided with a central axial bore 23 which terminates in the inner lower part of the slide 15, and with a radial bore 24 from the periphery, which opens out into the bore 23 above the bottom 25 thereof. The inner part 23a of the bore creates a blind space in which powder forms an erosion-preventing cushion 26. By turning the slide 180°, one of the containers 4 or 5 is connected together with the container 1, permitting powder to be transported to the desired container.

In the embodiment of the valve 7 shown in FIG. 4, the upstream conduit is still connected to the lid 19, but the downstream conduits 20 and 21 are axially connected to the end wall 27 of the housing 14. At the same radial distance from the center line of the valve as the bores 30 and 31 in the end wall 27 and the downstream conduits 20 and 21, the slide 15 is provided with a second axial bore 32. The slide is further provided with a radial connection 33 between the bores 23 and 32. The connection 33 is connected to the bore 23 so that a blind space 23a is created above the bottom of the connection 33.

Figure 5:
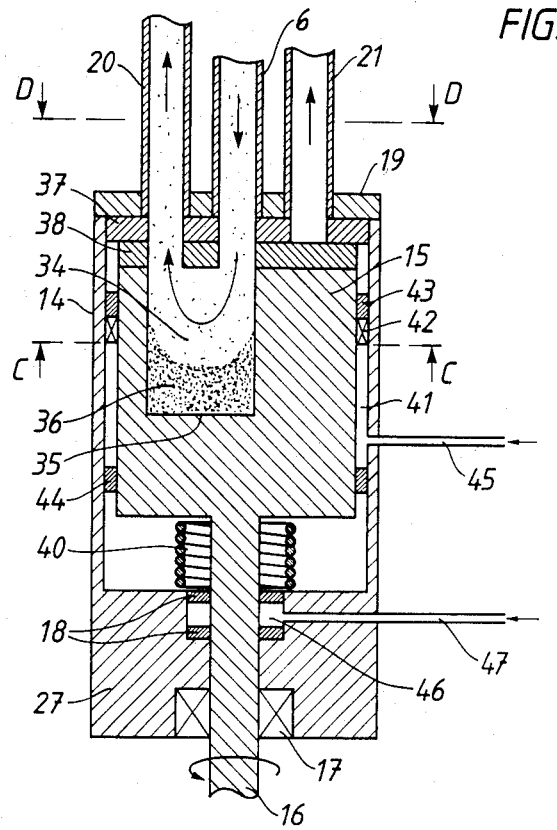

FIG. 5 shows a further alternative embodiment of the valve 7. In this both the upstream conduit 6 and the downstream conduits 20 and 21 are all connected to the lid 19 of the housing 14. The upstream conduit 6 is connected centrally with the downstream conduits 20 and 21 radially outside the upstream conduit 6. The rotary slide 15, in this embodiment of the valve, is formed with a slot-shaped, radially oriented recess 34 having such an axial extension that an erosion-preventing cushion 36 of powder will be formed at the bottom 35 of said recess 34 during operation. The recess 34 has such a radial extension as to provide a connection between the upstream conduit 6 and one of the downstream conduits 20 and 21 depending on the angular position of the slide. In view of the fact that many powder materials are greatly abrasive, the lid 19 and the slide 15, as shown in FIG. 5, may be provided with replaceable wear linings 37 and 38 of a material resistant to abrasion. To compensate for the wearing down of these wear linings, the slide 15 is urged by a spring 40 in a direction towards the lid 19 so that the wear linings 37, 38 are permanently—and despite wear—held pressed against each other. The slide 15 and the housing 14 are suitably formed such that an annular gap 41 is formed between them. A guide bearing 42 and sealing rings 43 and 44 are arranged in the gap 41. The gap 41 is supplied with sealing gas from a pressure gas source (not shown) through the conduit 45. The pressure gas source may, for example, be the compressor which delivers gas to the pneumatic transportation (12 in FIG. 1). Also the space 46 between the seals 18 is supplied with sealing gas from the pressure gas source through the conduit 47. Sealing gas is only necessary when the pneumatic transportation takes place at very high pressure ($>4$ bar (abs)).

Figures 8, 8A:
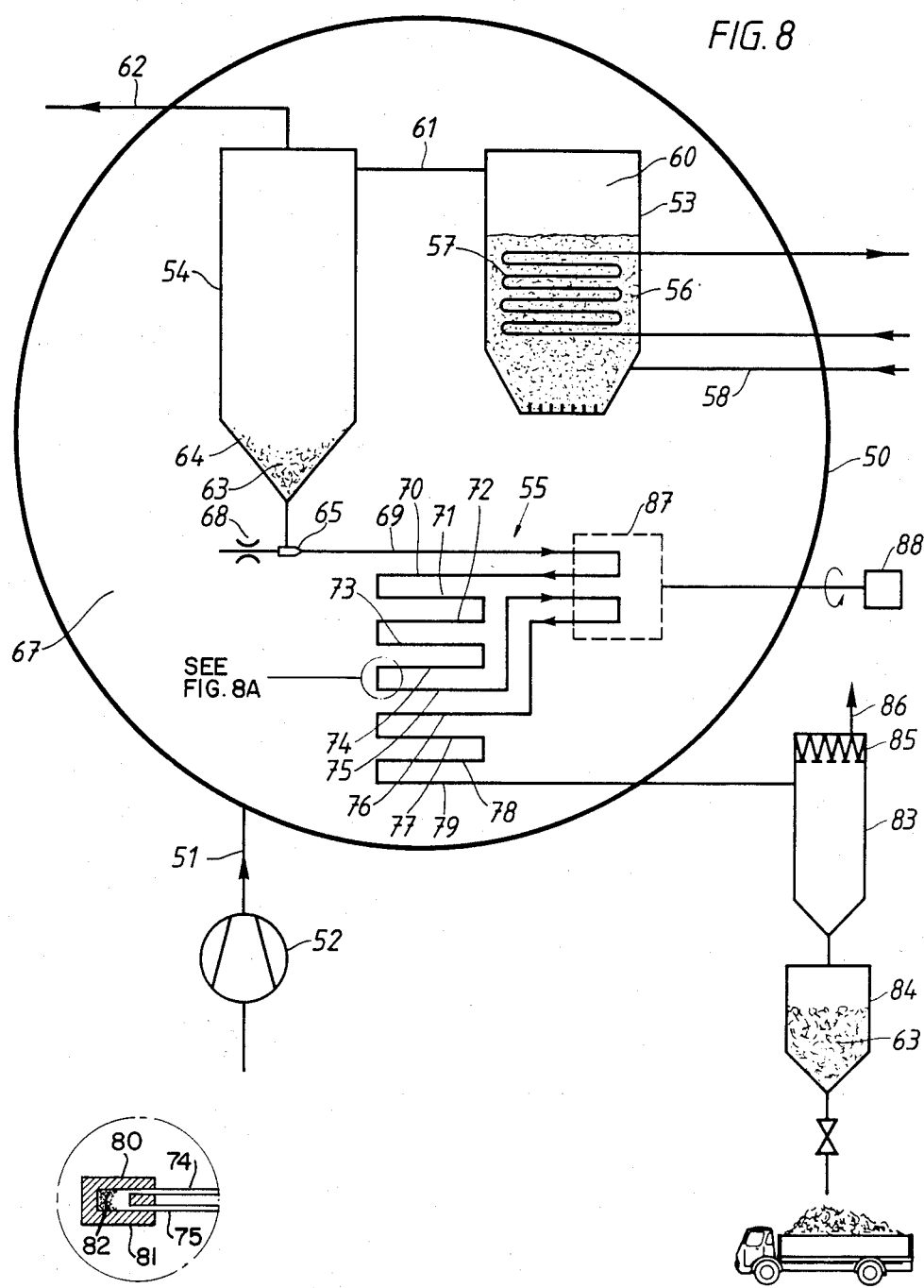
FIGS. 8 and 9 show transportation system as applied to a PFBC plant for discharging ashes separated in cyclone cleaners.
Figures 9, 9A:
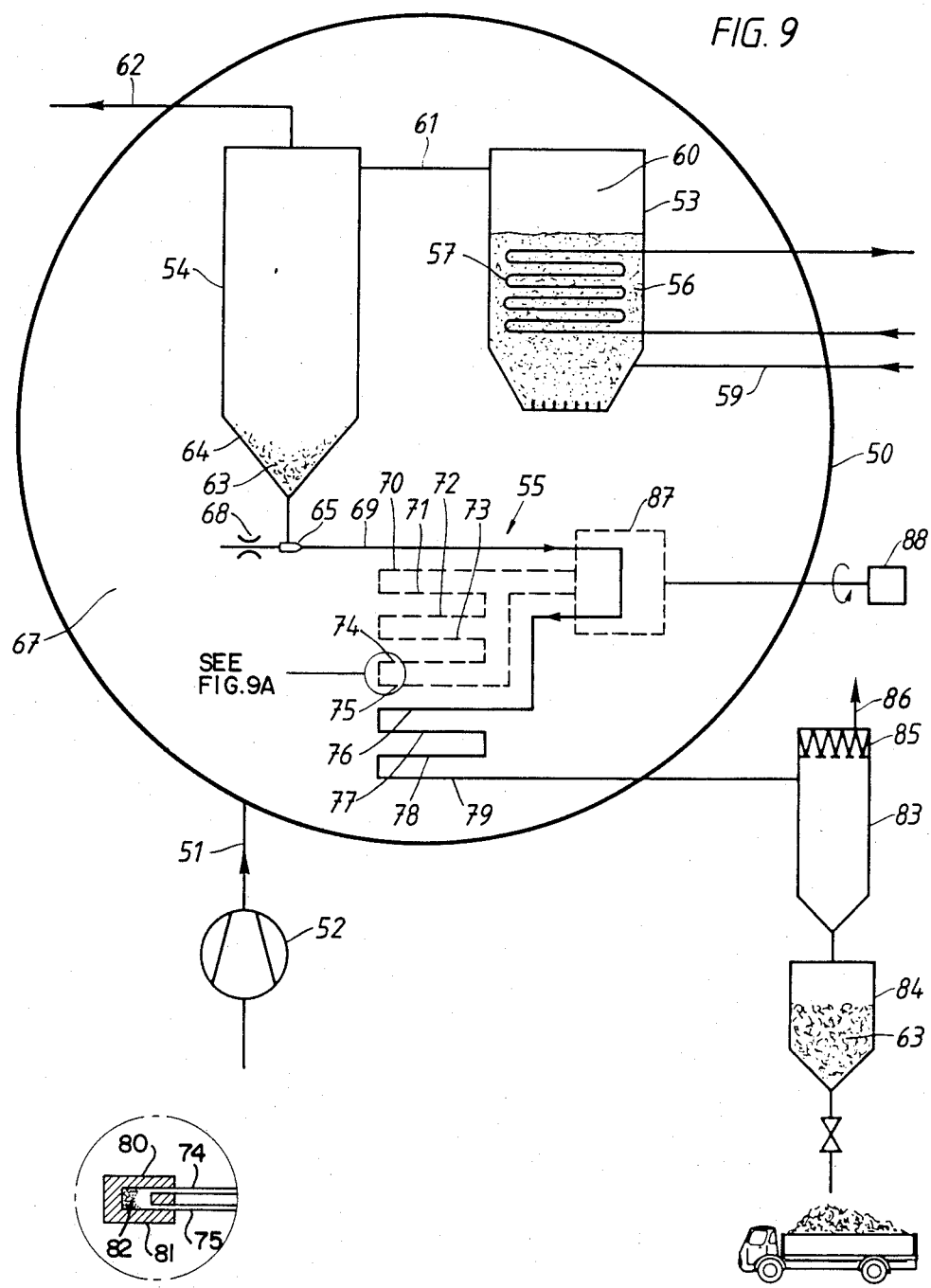

In the PFBC plant according to FIGS. 8 and 9, the invention is applied to an ash feeding-out system for obtaining different transport paths in order to adapt, in a suitable manner, the number of tubes within the feeding-out system to different operating conditions. In these figures, 50 designates a pressurized container. Through the conduit 51 the pressurized container 50 is supplied with combustion air from a compressor 52. The pressurized container 50 encloses a combustion chamber 53, a cyclone 54 and an ash discharge device 55. In reality a large number of cyclones are connected in parallel and in series. In the lower part of the combustion chamber 53 there are a fluidized bed 56 and a bundle 57 of tubes for cooling the bed 56 and for generating steam for a steam turbine (not shown). Fuel is fed into the bed 56 through a conduit 58 from a fuel storage (not shown). The free board 60 above the bed 56 is connected to the cyclone 54 through a conduit 61. In the cyclone 54 ashes 63 are separated from the combustion gases before these gases are led to a gas turbine (not shown) via the conduit 62. Ashes are collected in the conical bottom part 64 of the cyclone 54 and are fed out via the ejector 65 to an ash discharge device 55 of the type disclosed in more detail in U.S. patent application Ser. No. 563,427. The ejector 65 and the discharge device 55 are supplied with additional transport gas also from the compartment 67 of the pressurized container 50 via a throttle means 68. The ash discharge device 55 includes a number of parallel tubes which may vary in number between 20 and 100. However, in the schematic FIG. 8 only 11 tubes are shown, namely 69–79. The gas-ash flow in the ash discharge device 55 is transferred from an upstream tube to a downstream tube in a connecting chamber 81, shown in FIG. 8A, while being diverted 180° in order to bring about a pressure drop. The space 81 in the connecting chambers have such a depth that an erosion-preventing cushion 82 of powder is formed during operation. The last tube 79 of the ash discharge device 55 is extended, passes the wall of the container 50 and is connected to a cyclone 83, which separates ashes from transport gas. The ashes are collected in the container 84. The transport gas is filtered in the filter 85 before it is released through the conduit 86.

Figure 6:
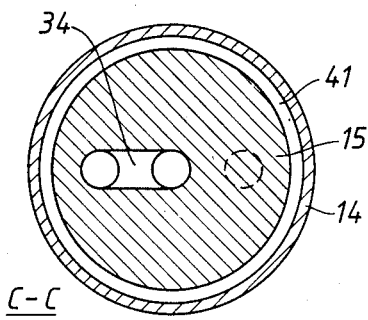
FIGS. 6 and 7 show radial sections through the valve according to C—C and D—D, respectively, in FIG. 5.
Figure 7:
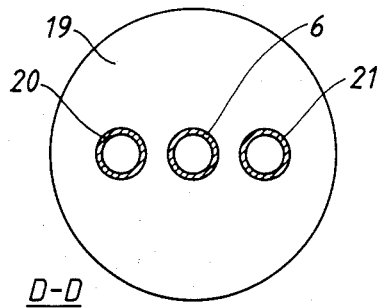

The ash discharge device 55 comprises a switching valve 87 by means of which the tubes 70–75 may be bypassed when the plant is operated with a low load. The construction and function of the valve are shown and described with reference to FIGS. 10–13. The valve 87 has, in principle, the same construction as the valve shown in FIGS. 5–7. The difference primarily resides in the design of the slide 15. Said slide 15 is formed with two recesses 90 and 91, the inner parts 90a and 91a of which form blind spaces, where erosion-preventing powder cushions 92 and 93, respectively, are created. The lid 19 of the valve 87 has four tube connections. The tube 69 from the ejector 65 is connected to the lid of the valve 87 at its mid-point. The tubes 70, 75 and 76 are connected to the lid 19 radially outside the tube 69. The tubes 70 and 76 are connected at the same radial distance from the connection of the tube 69.

Figure 10:
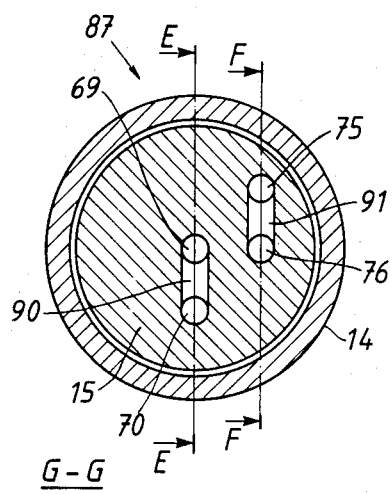
FIGS. 10 and 11 show radial sections according to G—G in FIGS. 12 and 13 with the valve slide in different positions.
Figure 12:
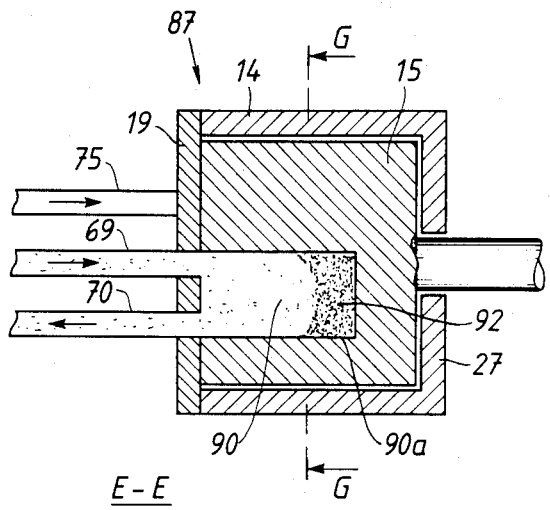
FIGS. 12 and 13 show axial sections through the valve as indicated by E—E and F—F, respectively, in FIG. 10.
Figure 11:
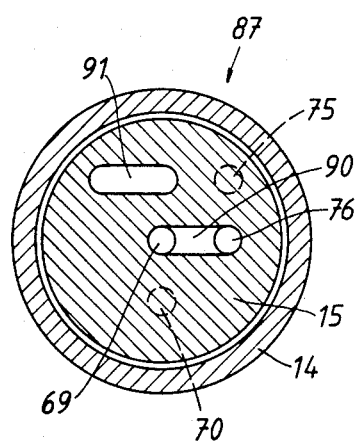
Figure 13:
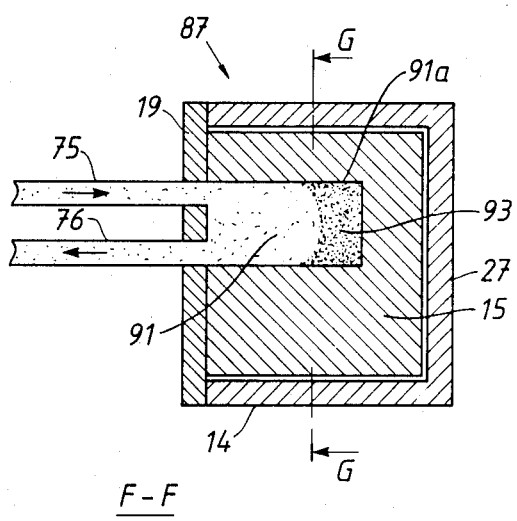

The valve 87 is utilized for adapting the ash discharge device 55 to different operating conditions. When the plant is operated with full power and high pressure in the container 50, a greater number of diversions of the ash-gas flow in the ash discharge device is required for the necessary pressure reduction than at a low power and a lower operating pressure. In low load operation the pressure drop in the ash discharge device 55 may become inconveniently high and the transportation speed too low, so that there is a risk of clogging. In full load operation, the ash-gas flow is allowed to pass through all the tubes in the ash discharge device 55, as shown in FIG. 8. The slide 15 of the valve is adjusted as shown in FIGS. 10, 12 and 13. In the valve 87 the ash-gas flow is transferred from the tube 69 to the tube 70 in the recess 90 of the slide 15, flows through the tubes 70-75 back to the valve 87, and is transferred there from the tube 75 to the tube 76 in the recess 91 of the slide 15, and further flows in tubes 76-79 to the cyclone 83 outside the container 50. In partial load operation, the tubes 70-75 are bypassed, as shown in FIG. 9 where the used tubes 76-79 in the ash discharge device 55 are shown in unbroken lines and the bypassed tubes 70-75 are shown in dashed lines. The by-pass is carried out by rotating the slide 15 of the valve 87 90° from the position shown in FIG. 10 to the position shown in FIG. 11 with the aid of the drive device 88. The ash-gas flow is then transferred from the tube 69 directly to the tube 76 in the recess 90 of the slide 15. An ash feeding-out system may include several valves or valves which permit a plurality of bypass alternatives, so that for each power level of the plant optimum operating conditions in the ash feeding-out system may be obtained.

The drawings only show valves with one feeding-in conduit and two or three feeding-out conduits and a switching valve with a possibility of selecting two alternative transport paths within an ash discharge device. Valves with a plurality of feeding-in and feeding-out conduits are possible as well as valves with a plurality of switching possibilities for a plurality of different transport paths within an ash discharge device or other similar equipment. It is also feasible to adapt the valve to a system involving the accumulation of material from a plurality of supply conduits so that the material is fed out through a common outlet conduit, so that material may be taken out optionally from two or several storage containers at the same time in a plant having a plurality of storage containers.

What is claimed is:

1. A switching valve for selection of different paths for a flow of particulate material, such as powdered and granular materials, when transported by a gas in a pneumatic transport system for the particulate material, said switching valve comprising:

a housing with connections for an upstream conduit and a plurality of downstream conduits;

a rotor arranged for rotation within said housing and having radially extending surfaces axially opposite each other and a compartment with an open end at one radial surface facing the mouth of said upstream conduit connection, a closed end toward the opposite radial surface, a radial extension within the rotor forming at least a portion of a discharge connection between the compartment and any one of said downstream conduit connections, and an axial extension within the rotor forming a blind space at its closed end for providing a cushion of said particulate material;

driving means for rotating said rotor to position said discharge connection to open out said compartment into any one of said of downstream conduit connections; and, means for supporting said rotor at said opposite radial surface for rotation within said housing, the axial extension of said compartment within said rotor having a sidewall with a radial thickness at least substantially equal to the radial extent of the radial extension of said compartment.

2. Pneumatic transportation system according to claim 1, in which the downstream conduits make an angle with the upstream conduit which is preferably about 90°.

3. Pneumatic transportation system according to claim 1, in which the upstream and downstream conduits are parallel but axially displaced relative to each other.

4. A pneumatic transportation system according to claim 1 in which said housing comprises a valve housing with connections for an upstream conduit and a plurality of downstream conduits, and said rotor comprises a rotary slide rotatably arranged in the valve housing.

5. A pneumatic transportation system according to claim 4, in which the slide has an axial bore opposite to the connection of the upstream conduit to the valve housing, as well as a radial bore which can be positioned with respect to the connection of any one of said downstream conduits, said radial bore opening into said axial bore at a distance from the bottom of said axial bore.

6. A pneumatic transportation system according to claim 1, wherein the transportation system is included in a PFBC plant and is utilized for feeding out bed material or ashes from a container which is under pressure, and said housing and rotor provide a valve for a bed or ash discharge device with a plurality of series-connected tube parts between which the gas and material flow is diverted to reduce the pressure, the valve being connected to at least two different tube parts downstream of an upstream tube part so that a number of tube parts in the discharge device can be bypassed.

7. A pneumatic transport system according to claim 1 in which said upstream conduit has a substantially uniform wall thickness, and at least one wall of said compartment has a thickness substantially greater than the wall thickness of said upstream conduit.

8. A pneumatic transport system according to claim 7 in which said at least one wall of greater thickness is axially adjacent to the closed end of said compartment.

9. A pneumatic transport system according to claim 7 in which said compartment is defined by axial and radial walls having a thickness substantially greater than the wall thickness of said upstream conduit.

10. A pneumatic transport system according to claim 1 which further includes seal means for sealing said rotor within said housing.

11. A pneumatic transport system according to claim 1 in which said support means includes means for urging said radial surface of the rotor with said open end of the compartment against a cooperating member of said housing.

12. A pneumatic transport system for particulate material, such as powdered and granular materials, with a switching valve for selection of different paths for a flow of the particulate material when transported by a gas, said transport system comprising:

a valve housing having an end wall;
an upstream conduit connected to said end wall;
a plurality of downstream conduits connected to said end wall;
rotor means comprising a rotary slide rotatably arranged within said housing and having radially extending surfaces axially opposite each other and a compartment with an open end at one radial surface facing the mouth of said upstream conduit and a closed end toward the opposite radial surface, said compartment extending radially within said rotary slide to provide a discharge connection between said compartment and any one of said downstream conduits, and said compartment extending axially within said rotary slide to form a blind space at its closed end for providing a cushion of said particulate material; and,
driving means for rotating said rotary slide for positioning said discharge connection to open out said compartment into any one of said plurality of downstream conduits, said discharge connection comprising a radial transfer channel between said upstream conduit and one of said downstream conduits when said rotor is in any one of said open out positions.

13. A pneumatic transport system for particulate material, such as powdered and granular materials, with a switching valve for selection of different paths for a flow of the particulate material when transported by a gas, said transport system comprising:

a housing;
a plurality of upstream conduits connected to said housing;
a plurality of downstream conduits connected to said housing;
a rotor rotatably arranged within said housing and having radially extending surfaces axially opposite each other and a plurality of compartments, each of said compartments having an open end at one radial surface for facing the mouth of a corresponding one of said upstream conduits, a closed end toward the opposite radial surface, a radial extension forming at least a portion of a discharge connection between the compartment and at least a corresponding one of said downstream conduits, and an axial extension forming a blind space at said closed end for providing a cushion of said particulate material; and,
driving means for rotating said rotor to position said discharge connections to open out each of said compartments into at least said corresponding downstream conduit.

14. A pneumatic transport system according to claim 13 in which the radial extension of at least one of the compartments provides at least a portion of a discharge connection between the compartment and any one of at least two downstream conduits, and said driving means rotates said rotor to position said discharge connections to open out said at least one compartment into any one of said at least two downstream conduits.

15. A pneumatic transport system with a particulate bed discharge device for feeding out ashes or other particulate material from a bed in a container which is under pressure in a PFBC plant, and with a switching valve for selection of different paths for a flow of said particulate material when transported by a gas, said transport system comprising:

a housing with connections for a plurality of upstream conduits and a plurality of downstream conduits;
a rotor within said housing having radially extending surfaces axially opposite each other and a plurality of compartments, each of said compartments having an open end at one radial surface for facing the mouth of at least one of said upstream conduit connections, a closed end toward the opposite radial surface, a radial extension providing at least a portion of a corresponding discharge connection between the compartment and at least one of said downstream conduit connections, and an axial extension forming a blind space at its closed end for providing a cushion of said particulate material; and,
a driving means for rotating said rotor for positioning said discharge connections to open out each of said compartments into at least one of said downstream conduit connections;
said housing and rotor providing a valve for a particulate bed discharge device with a plurality of series-connected conduit parts between which the gas and bed material flow is diverted to reduce the pressure, said housing being connected to at least two different upstream conduit parts and at least two different downstream conduit parts so that a plurality of conduit parts in said discharge device can be bypassed, and said two upstream conduit parts forming upstream conduit connections and said two downstream conduit parts forming downstream conduit connections to said housing;
and said rotor having at least two of said compartments and said two compartments and corresponding discharge connections being arranged in the rotor such that in a first position of the rotor, a first chamber connects a first upstream conduit to a first downstream conduit and a second chamber connects a second upstream conduit to a second downstream conduit, and in a second position of the rotor, the first chamber connects the first upstream conduit to the second downstream conduit and the first downstream conduit and the second upstream conduit are shut off.

16. A switching valve for selection of different paths for a flow of particulate material, such as powdered and granular materials, when transported by a gas in a pneumatic transport system for the particulate material, said switching valve comprising:

a housing with connections for an upstream conduit and a plurality of downstream conduits;
a substantially cylindrical rotor arranged for axial rotation within said housing and having radially extending surfaces axially opposite each other and a compartment with an open end at one radial surface facing the mouth of said upstream conduit connection, a closed end toward the opposite radial surface, a radial extension within the rotor forming at least a portion of a discharge connection between the compartment and any one of said downstream conduit connections, and an axial extension within the rotor forming a blind space at its closed end for providing a cushion of said particulate material;
driving means for rotating said rotor to position said discharge connection to open out said compartment into any one of said downstream conduit connections, and,
means for supporting said rotor at said opposite radial surface for rotation within said housing.

* * * * *